(No Model.)
L. DUNCAN.
METHOD OF MAKING SECONDARY BATTERY PLATES.
No. 394,473. Patented Dec. 11, 1888.
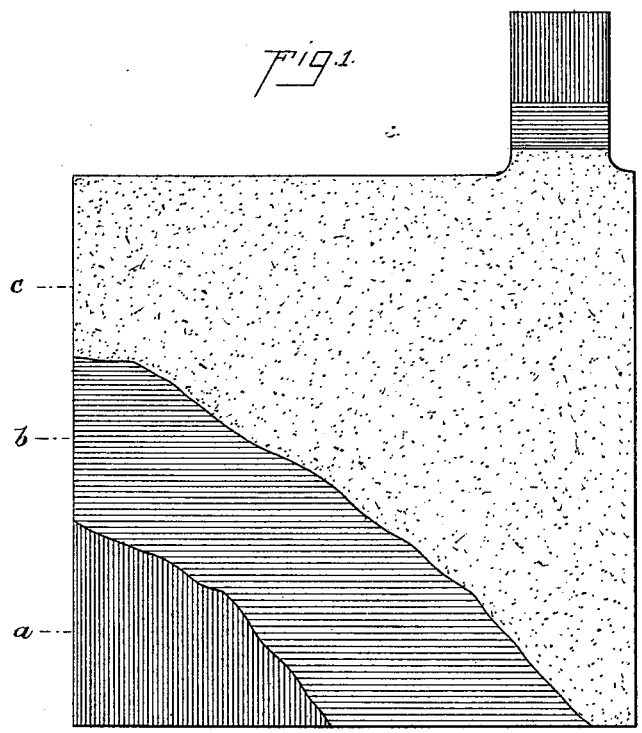
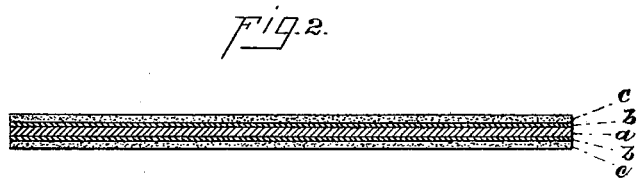
Witnesses,
Inventor,
Louis Duncan
By his Attorneys

UNITED STATES PATENT OFFICE.

LOUIS DUNCAN, OF BALTIMORE, MARYLAND.

METHOD OF MAKING SECONDARY-BATTERY PLATES.

SPECIFICATION forming part of Letters Patent No. 394,473, dated December 11, 1888.

Application filed May 12, 1888. Serial No. 273,694. (No model.)

*To all whom it may concern:*

Be it known that I, LOUIS DUNCAN, of Baltimore, in the State of Maryland, have invented a certain new and useful Improvement in the Manufacture of Secondary - Battery Plates, of which the following is a specification.

My invention relates to a method of manufacturing the plates or electrodes of secondary batteries, and especially to a method of applying a protecting-covering and an active material to the cores or supporting-plates, and may be considered an extension of the method set forth and claimed in my application, Serial No. 273,693, of even date herewith.

In carrying my invention into effect I take the core or supporting-plate, (or any required number thereof,) which may be of any suitable form and material, and first provide the same with such impervious protecting-coating by making the same the anode in an electrolytic bath composed of an alkaline solution of a salt of lead, preferably a solution of litharge in caustic soda or potash. For the cathode of the cell I prefer to use a plate of lead. I use a very weak current and continue the operation a long time, and also keep up an agitation of the bath during the process. Then, in order to apply the active material, I employ with a similar bath a heavy current, so as to act upon the solution rapidly. At the same time I preferably heat the bath externally. The result is the formation upon the anode of a coating or layer of peroxide of lead, which is of a loose or porous formation, but adheres with sufficient firmness to the core, and may be made of any required thickness.

The protecting-coating produced as above described is a thin even hard dense coating of an oxide of lead, which I have found to be impervious to such acid solutions as are used in secondary batteries.

In the accompanying drawings, Figure 1 is an elevation, and Fig. 2 a cross-section, of a plate made according to my invention.

The plate *a* is provided with the impervious protecting - coating, *b*, on both sides, and the active material, *c*, is placed externally to this coating, as has been already explained.

I do not claim herein the core or supporting-plate provided with a protecting-covering, as above described, since this is claimed in my application, Serial No. 273,692. Neither do I claim herein by itself the above-described method of producing such protecting-covering, this being claimed in my application, Serial No. 273,693, above referred to.

What I claim is—

1. The herein-described method of making a secondary-battery plate, which consists in first applying to the core or supporting-plate an impervious coating of material and then depositing thereon from an alkaline solution of a salt of lead.

2. The herein-described method of making a secondary-battery plate, consisting in first applying to the core or supporting-plate a hard dense layer of an oxide of lead and then externally thereto a layer of loose or porous peroxide of lead.

3. The herein-described method of making a secondary-battery plate, which consists in first depositing slowly upon the core or supporting - plate by means of a weak current from an alkaline solution of a salt of lead, whereby a hard dense coating of an oxide of lead is formed, and then depositing rapidly thereon from a similar solution by means of a heavy current, whereby a layer of loose or porous peroxide of lead is formed.

4. The herein-described method of making a secondary-battery plate, which consists in first applying to the core or supporting-plate an impervious coating of material and then depositing thereon from an alkaline solution of a salt of lead and at the same time heating the solution.

This specification signed and witnessed this 9th day of May, 1888.

LOUIS DUNCAN.

Witnesses:
W. SCOTT GOSNELL,
T. H. C. STITCHER, Jr.